(12) United States Patent
Kapoor

(10) Patent No.: US 11,605,010 B1
(45) Date of Patent: *Mar. 14, 2023

(54) COMPUTER INCIDENT SCORING

(71) Applicant: Digital.ai Software, Inc., Burlington, MA (US)

(72) Inventor: Rahul Kapoor, Bellevue, WA (US)

(73) Assignee: Digital.ai Software, Inc., Burlington, MA (US)

( * ) Notice: Subject to any disclaimer, the term of this patent is extended or adjusted under 35 U.S.C. 154(b) by 181 days.

This patent is subject to a terminal disclaimer.

(21) Appl. No.: 17/238,047

(22) Filed: Apr. 22, 2021

Related U.S. Application Data (63) Continuation of application No. 15/805,786, filed on Nov. 7, 2017, now Pat. No. 11,017,300.

(51) Int. Cl.
| | | |
|---|---|---|
| *G06N 5/025* | (2023.01) | |
| *G06F 16/903* | (2019.01) | |
| *G06Q 10/0631* | (2023.01) | |
| *G06F 16/25* | (2019.01) | |

(52) U.S. Cl.
CPC ............. *G06N 5/025* (2013.01); *G06F 16/25* (2019.01); *G06F 16/90335* (2019.01); *G06Q 10/06311* (2013.01)

(58) Field of Classification Search
CPC ... G06F 16/90335; G06F 16/25; G06N 5/025; G06Q 10/06311
See application file for complete search history.

(56) References Cited

U.S. PATENT DOCUMENTS

| | | |
|---|---|---|
| 6,252,852 B1 | 6/2001 | Rowles et al. |
| 6,868,413 B1 | 3/2005 | Grindrod et al. |
| 10,346,851 B1 | 7/2019 | Kapoor et al. |
| 10,613,525 B1 | 4/2020 | Kapoor et al. |
| 11,017,300 B1 * | 5/2021 | Kapoor ............ G06Q 10/06311 |

(Continued)

OTHER PUBLICATIONS

Satish Muddam, "AppDynamics ServiceNow REST API Alerting Extension," AppDynamics Exchange, Cisco, Oct. 17, 2017, 10 pages, https://www.appdynamics.com/community/exchange/extension/appdynamics-servicenow-rest-api-alerting-extension/.

(Continued)

*Primary Examiner* — Etienne P Leroux
(74) *Attorney, Agent, or Firm* — Rahman LLC (57) ABSTRACT

A system that suggests and refines priority, severity, historical resolution, resolution time and assignment group to resolve auto-generated incidents is provided. The system leverages an incident characterization list tracking essence key phrases associated with historical incidents generated by an application performance management (APM) system and a machine data (MD) analysis system. The system automatically obtains a first auto-generated incident, from the APM system or the MD analysis system, based on any specified search criteria being met, or detection of a deviation in the value of key metrics from a specified threshold value. The system further automatically extracts essence key phrases of the first auto-generated incident and matches it with the essence key phrases of the incident characterization list to suggest priority, severity, historical resolution and resolution time, relevant knowledge base articles and assignment group for the first auto-generated incident to aid in resolution of the first auto-generated incident.

9 Claims, 7 Drawing Sheets

(56) References Cited

U.S. PATENT DOCUMENTS

| | | | |
|---|---|---|---|
| 2005/0146426 A1 | 7/2005 | Pereira et al. | |
| 2007/0168343 A1 | 7/2007 | Best et al. | |
| 2009/0292956 A1 | 11/2009 | Rivera et al. | |
| 2013/0007764 A1 | 1/2013 | Corum et al. | |
| 2014/0379895 A1 | 12/2014 | Jain | |
| 2016/0196501 A1 | 7/2016 | Anand et al. | |
| 2017/0068721 A1 | 3/2017 | Chafle et al. | |
| 2017/0180201 A1* | 6/2017 | Guven | G06N 20/00 |

OTHER PUBLICATIONS

Splunk, "Push integration with the Splunk App for ServiceNow," User Guide Version 4.0.3, Oct. 13, 2016, 4 pages, http://docssplunk.com/Documentation/ServiceNow/4.0.3/User/Commandsalertactionsandscripts.

Splunk, "What is Machine Data?," Splunk, 2015-2017, 5 pages, https://www.splunk.com/en_us/resources/machine-data.html.

Splunk, "The Splunk Guide to Operational Intelligence," Splunk, 2016, 17 pages, https://www.splunk.com/pdfs/solution-guides/splunk-guide-to-operational-intelligence.pdf.

Sumo Logic, "ServiceNow Integration with Sumo Logic," Sumo Logic, accessed Nov. 2, 2017, 5 pages, https://www.sumologic.com/application/servicenow/.

AppDynamics, "Overview of Application Monitoring," AppDynamics LLC, 2012-2017, 4 pages, https://docs.appdynamics.com/display/PRO43/Overview+of+Application+Monitoring.

AppDynamics, "AppDyanics Concepts," AppDyanmics LLC, 2012-2017, 4 pages, https://docs.appdynamics.com/display/PRO43/AppDynamics+Concepts.

New Relic, "Apdex: Measuring user satisfaction," New Relic, Inc., 2008-2017, 4 pages, https://docs.newrelic.com/docs/apm/new-relic-apm/apdex/apdex-measuring-user-satisfaction.

* cited by examiner

COMPUTER INCIDENT SCORING

CROSS-REFERENCE TO RELATED APPLICATIONS

This application is a divisional application of U.S. Ser. No. 15/805,786, filed on Nov. 7, 2017, the complete disclosure of which, in its entirety, is herein incorporated by reference.

BACKGROUND

Technical Field

The embodiments herein generally relate to automatic suggestions to resolve auto-generated incidents, and more specifically to a system and method for automatically suggesting and refining priority, severity, historical resolution, resolution time and assignment group to resolve the auto-generated incidents.

Description of the Related Art

An IT Service Management (ITSM) system typically tracks Incident, Problem and Changes. Changes are typically performed to resolve Incidents and Problems. However, the changes may be the cause of new Incidents as well. The ITSM system also link Incidents, Problems and Changes to CIs that they relate to. Some ITSM systems may explicitly identify Outages (i.e. the unavailability of a service) and link the outages to the service CI, and related Incidents or Problems, allowing for Outage duration, Severity and Business Impact to be tracked more easily. Outages are quite often caused by Changes, with some estimates putting Changes as the source of Outages 80% of the time. An Application Performance Management System (e.g. APPDYNAMICS® and NEW RELIC®) and a Machine data analysis system (e.g. SPLUNK® and SUMO LOGIC®) that monitor applications and hardware components, can be configured to automatically create Incidents within ITSM systems such as ServiceNow or issue tracking systems such as Atlassian JIRA®, based on conditions specified by saved searches or alerts that are typically defined to detect problems in the monitored applications and hardware components. Since quite a few of these Incidents may be created by the APM system and MD analysis system, responding to those Incidents in a timely fashion may become a challenge. However, none of the existing systems provide sophisticated aids to improve resolution time or identify Changes behind such incidents and correlate such incidents received from the application performance management (APM) system and the machine data (MD) analysis system amongst each other and with manually created incidents.

SUMMARY

In view of the foregoing, an embodiment herein provides a non-transitory computer readable storage medium storing a sequence of instructions, which when executed by a processor, causes automatic suggestion and refinement of priority, severity, historical resolution, resolution time and assignment group to resolve auto-generated incidents, the sequence of instructions includes (i) automatically computing an incident characterization list by tracking essence key phrases associated with each of historical incidents generated by an application performance management (APM) system and a machine data (MD) analysis system along with historical prioritization, severity, resolution, resolution time, relevant knowledge base articles and assignment group information of the historical incidents, (ii) automatically obtaining a first auto-generated incident, from the application performance management (APM) system or the machine data (MD) analysis system, generated for a configuration item (CI), based on specified search criteria which is a Boolean expression on key metrics of the APM system or the MD system being met, or a deviation in the value of the key metrics of the APM system or the MD system from a specified threshold value, (iii) automatically extracting essence key phrases of the first auto-generated incident, (iv) automatically matching the essence key phrases of the first auto-generated incident with the essence key phrases of the incident characterization list to suggest priority, severity, historical resolution and resolution time, relevant knowledge base articles and assignment group for the first auto-generated incident, and (v) transforming the first auto-generated incident to a refined first auto-generated incident by populating its priority, severity, resolution, resolution time, relevant knowledge base articles and assignment group fields with the suggested values to obtain a computer-executable object saved in a memory on a computer for execution by the processor to aid in resolution of the first auto-generated incident.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a method and system for automatically suggesting and refining priority, severity, historical resolution, resolution time and assignment group to resolve auto-generated incidents generated by an Application performance management (APM) and a Machine data (MD) analysis system. Referring now to the drawings, and more particularly to FIGS. 1 through 6, where similar reference characters denote corresponding features consistently throughout the figures, preferred embodiments are shown.

As used herein, several systems and terms are defined below:

An IT Service Management (ITSM) system typically includes several process areas such as (a) Incident management that is focused on restoring normal service operation at the earliest, (b) Problem management that is focused on determining the root cause of problems and thus preventing further incident, (c) Change management that is focused on ensuring that standardized methods and procedures are used for efficient and prompt handling of all changes, and (d) Configuration management that tracks application/hardware (e.g. a physical IT asset) as configuration items (CIs) along with their properties and relationships in a Configuration management database.

An Application Performance Management (APM) system typically includes application monitoring products to understand applications and data flows through applications, web services, message queues and databases. In the APM system, a business transaction is used to represent data processing flow for a request. User requests to applications are identified as entry points of a business transaction. The request path is traced from web servers to databases and other infrastructure components and performance metrics collected for each step processing the business transaction. The application monitoring products may define a score to measure the application performance.

A machine data (MD) analysis system typically includes information such as application logs, business process logs, call detail records, clickstream data, configuration files, database audit logs, file system audit logs, management and logging application programming interfaces (APIs), message queues, operating system metrics, status and diagnostic commands, packet/flow data, sensor data, syslogs, web access log, web proxy logs, windows event and wire data etc.

The term "configuration item" (CI) refers to entities which may be physical IT assets (ex. computer, router), logical (ex. DB instance) or conceptual (ex. an IT Service) that are tracked along with their properties and relationships in a Configuration Management database in an information technology service management (ITSM) system.

The term "Incident" refers to an unplanned interruption to a service, a reduction in the quality of a service or an event that has not yet impacted the service to a customer.

The term "Problem" refers to the root cause of related Incidents.

The term "Change" refers to a way to resolve a Problem. The Change is typically performed to resolve Incidents and Problems but may be the cause of new Incidents as well.

The term "essence key phrases" refers to phrases that are obtained by combining important keywords including related keywords that are identified using text analytics on textual fields of Incidents, Problem and Change records, with relevant structured fields of the Incident, Problem and Change records. The related keywords are identified by analyzing a keyword synonym map built using semantic analysis. In other words, the essence key phrases represent the essence of Incidents, Problems and Changes.

The term "deviation" refers to a difference from a normal level or a threshold level.

The term "outage" refers to unavailability or significant decrease in quality of service due to unexpected behavior of that particular service.

The term "resolution time" refers to an average time taken to resolve a type of incident.

The term "coverage gap" refers to a software or hardware area associated with the configuration item (CI) that is not covered by one or both of an application performance management (APM) system or a machine data (MD) analysis system.

The term "historical incident" refers to an incident that was previously generated by an APM system or a MD system and recorded in the ITSM system.

The term "outage records" refers to a record that comprises a list of outages that are linked with incidents.

The term "knowledge base articles" refers to documents in an organized repository of knowledge that is built by experts over time, that allow the reader of the article to understand and take appropriate action for issues relevant to an Incident discussed in the article.

The term "severity of incident" refers to how critical condition the incident is.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

Figure 1:
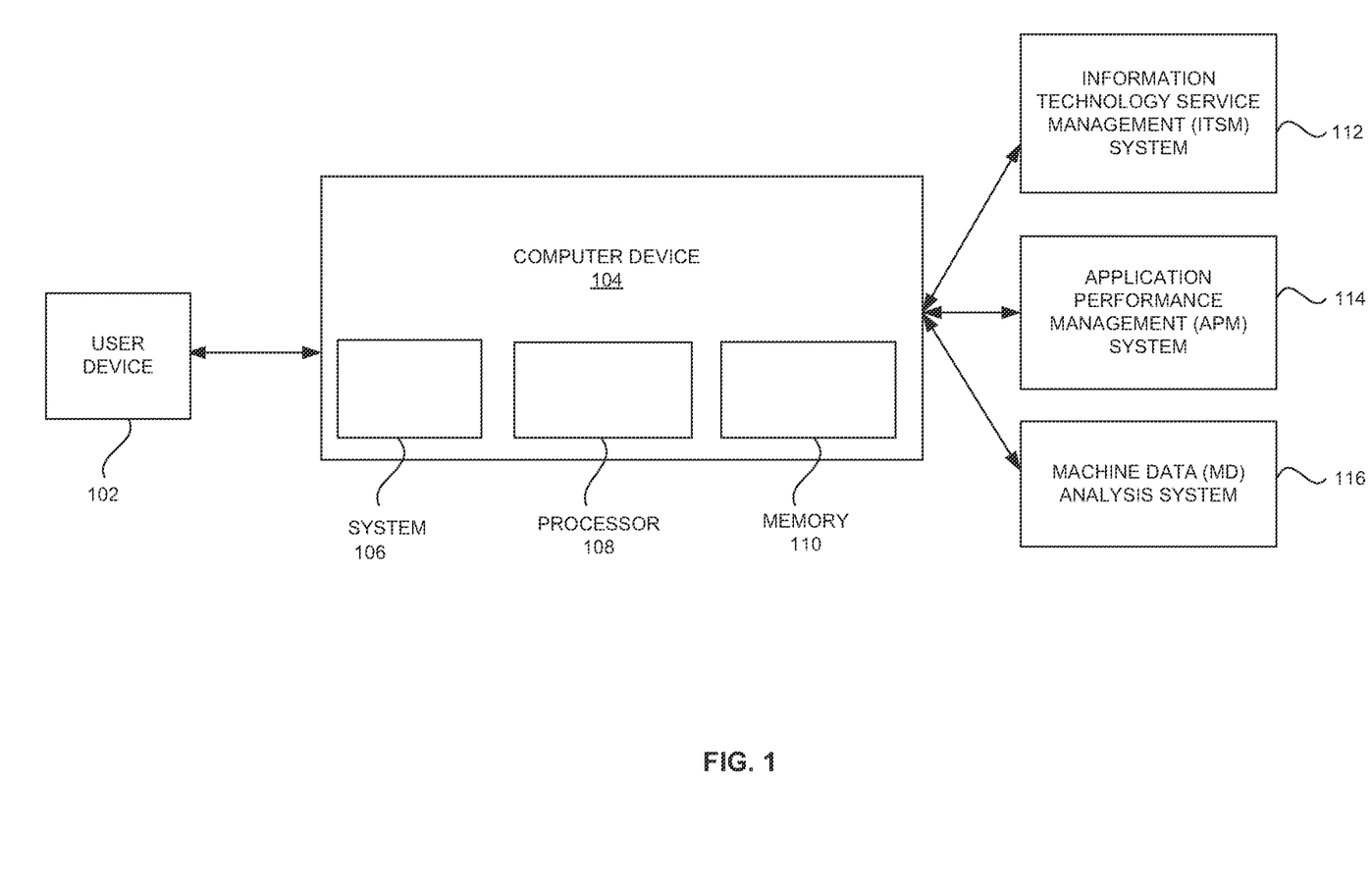
FIG. 1 is a block diagram illustrating a user device interacting with a system of a computer device for automatically suggesting and refining priority, severity, historical resolution, resolution time and assignment group to resolve auto-generated incidents according to an embodiment herein.

FIG. 1 is a block diagram illustrating a user device 102 interacting with a system 106 of a computer device 104 for automatically suggesting and refining priority, severity, historical resolution, resolution time and assignment group to resolve auto-generated incidents according to an embodiment herein. The computer device 104 further includes a memory 110 that stores a database and a set of instructions, and a processor 108 that is configured to execute the set of instructions. The database stores historical incidents generated by (a) an application performance management (APM) system 114 and (b) a machine data (MD) analysis system 116 along with historical prioritization, severity, resolution, resolution time, relevant knowledge base articles and assignment group information of the historical incidents. In an embodiment, the database stores manually generated incident by a user from an information technology service management (ITSM) system 112. The system 106 automatically computes an incident characterization list by tracking essence key phrases associated with each of the historical incidents generated by the application performance management (APM) system 114 and the machine data (MD) analysis system 116 along with historical prioritization, severity, resolution, resolution time, relevant knowledge base articles and assignment group information of the historical incidents. The system 106 automatically obtains a first auto-generated incident, from the application performance management (APM) system 114 or the machine data (MD) analysis system 116 generated for a configuration item (CI), based on specified search criteria which is a Boolean expression on key metrics of the APM system 114 or the MD system 116 being met, or a deviation in the value of the key metrics of the APM system 114 or the MD system 116 from a specified threshold value.

The system 106 automatically extracts essence key phrases of the first auto-generated incident. The system 106 automatically matches the essence key phrases of the first auto-generated incident with the essence key phrases of the incident characterization list to suggest priority, severity, historical resolution and resolution time, relevant knowledge base articles and assignment group for the first auto-generated incident. The system 106 transforms the first auto-generated incident to a refined first auto-generated incident by populating its priority, severity, resolution, resolution time, relevant knowledge base articles and assignment group fields with the suggested values to obtain a computer-executable object saved in the memory 110 on the computer device 104 for execution by the processor 108 to aid in resolution of the first auto-generated incident. In an embodiment, the user device 102 or the system 106 includes a display that displays the suggested priority, severity, historical resolution and resolution time, relevant knowledge base articles and assignment group that are identified in the form of a graphical user interface (GUI).

The system 106 automatically extracts (i) a time period when a problem underlying the first auto-generated incident occurred and (ii) the configuration item (CI) associated with the first auto-generated incident to identify a change that causes the first auto-generated incident. One or more changes that are executed for the configuration item (CI) in a time window prior to the time period of the first auto-generated incident are identified as potential changes that could have caused the first auto-generated incident. Then the system 106 automatically identifies a change that causes the first auto-generated incident by matching essence key phrases of potential changes with a change to incident list. In an embodiment, each historical change attributes to one or more incidents caused by the historical change. The change to incident list may be built and maintained based on identified clusters of related Incident, Problem and Changes.

The system 106 automatically detects a linkage of the first auto-generated incident to an outage from outage records. The system 106 automatically updates the incident characterization list based on the linkage of the first auto-generated incident to the outage. The system 106 further automatically flags similar incidents in the future for their propensity to cause the outage.

Figure 2:
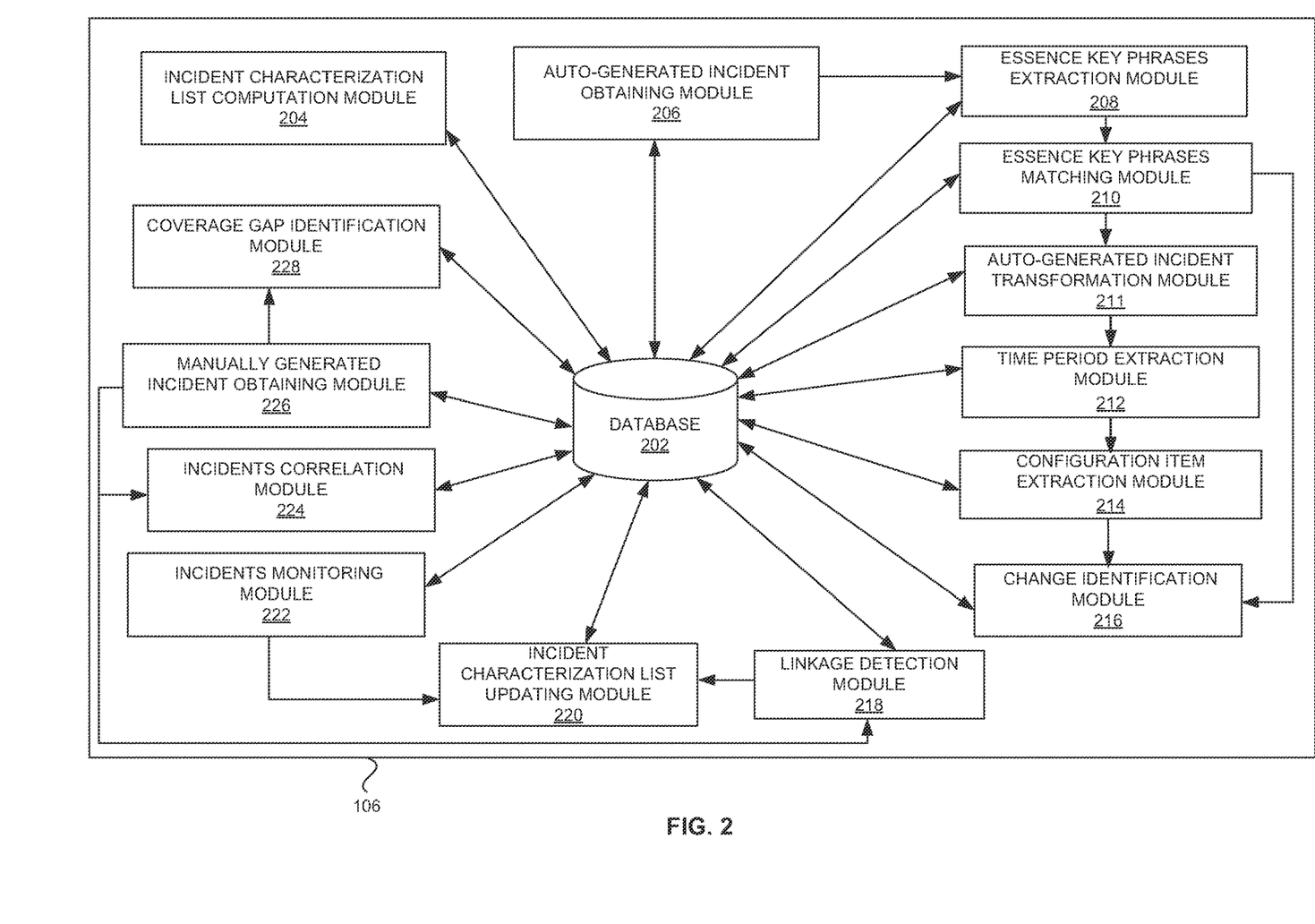
FIG. 2 illustrates an exploded view of the system of FIG. 1 according to an embodiment herein.

FIG. 2 illustrates an exploded view of the system 106 of FIG. 1 according to an embodiment herein. The system 106 includes a database 202, an incident characterization list computation module 204, an auto-generated incident obtaining module 206, an essence key phrases extraction module 208, an essence key phrases matching module 210, an auto-generated incident transformation module 211, a time period extraction module 212, a configuration item extraction module 214, a change identification module 216, a linkage detection module 218, an incident characterization list updating module 220, an incidents monitoring module 222, an incidents correlation module 224, a manually generated incident obtaining module 226 and a coverage gap identification module 228. In an embodiment, the above said modules are executed by the processor 108.

The incident characterization list computation module 204 computes an incident characterization list by tracking essence key phrases associated with each of historical incidents generated by the application performance management (APM) system 114 and the machine data (MD) analysis system 116 along with historical prioritization, severity, resolution, resolution time, relevant knowledge base articles and assignment group information of the historical incidents.

The auto-generated incident obtaining module 206 obtains a first auto-generated incident, from the application performance management (APM) system 114 or the machine data (MD) analysis system 116, generated for a configuration item (CI), based on specified search criteria which is a Boolean expression on key metrics or measures of the APM system 114 or the MD system 116 being met, or a deviation in the value of the key metrics or measures of the APM system 114 or the MD system 116 from a specified threshold value. In an embodiment, the deviation in the value of key metrics includes at least one of but not limited to (a) an increase in error rates, (b) critical errors or alerts from applications, hardware components, message queues or operating systems, (c) an increase in response time or a decrease in performance, (d) increase in CPU or memory utilization from a normal level.

The essence key phrases extraction module 208 automatically extracts essence key phrases of the first auto-generated incident. The essence key phrases matching module 210 automatically matches the essence key phrases of the first auto-generated incident with the essence key phrases of the incident characterization list to suggest priority, severity, historical resolution and resolution time, relevant knowledge base articles and assignment group for the first auto-generated incident. The auto-generated incident transformation module 211 transforms the first auto-generated incident to a refined first auto-generated incident by populating its priority, severity, resolution, resolution time, relevant knowledge base articles and assignment group fields with the suggested values to obtain the computer-executable object saved in the memory 110 on the computer device 104 for execution by the processor 108 to aid in resolution of the first auto-generated incident. In an embodiment, the assignment group includes one or more assignees. The first auto-generated incident is assigned to a least loaded assignee when workload information for the one or more assignees is available within the assignment group. The time period extraction module 212 automatically extracts a time period when a problem underlying the first auto-generated incident occurred. The configuration item extraction module 214 automatically extracts the configuration item (CI) associated with the first auto-generated incident to identify a change that causes the first auto-generated incident. In an embodiment, one or more changes that are executed for the configuration item (CI) in a time window prior to the time period of the first auto-generated incident are identified as potential changes that could have caused the first auto-generated incident. The system 106 may include an incidents clustering module (not shown) that automatically clusters relevant incident, problem and changes and maintains a change to incident list which tracks type of incidents caused by changes.

The change identification module 216 automatically identifies a change that causes the first auto-generated incident by matching essence key phrases of the potential changes with the change to incident list. The change to incident list includes a list of historical changes with their essence key phrases. Each historical change attributes to one or more incidents caused by the historical change. The change to incident list may be built and maintained based on identified clusters of related Incident, Problem and Changes. In an embodiment, when multiple changes are identified as potential changes, a change that causes the first auto-generated incident is identified by matching essence key phrases of the potential changes with essence key phrases of historical changes in the change to incident list and by identifying a type of incident that is historically caused by the potential changes. The essence key phrases of potential changes/historical changes include structured attributes (i.e. name value pairs) and important keywords extracted from unstructured text fields. The matching of essence key phrases of the potential changes with the essence key phrases of historical changes may be performed using a matching algorithm. The matching algorithm determines the matching of the structured attributes and the important keywords between the potential changes and the historical changes. If the structured attributes and the important keywords of a potential change is matched with the structured attributes and the important keywords of a historical change which lead to a type of incident that is similar to the first auto-generated incident, then the potential change is identified as the change that causes the first auto-generated incident. The Matching is defined as equality of structured attributes and important keywords of the essence key phrases of the potential changes and historical changes. The matching algorithm may consider subset information matches if there are no exact matches. In another embodiment, when only one change is identified as the potential change, the essence key phrases of that potential change are still matched with the essence key phrases of changes in the change to incident list to confirm that potential change is responsible for the first auto-generated incident.

The linkage detection module 218 automatically detects a linkage of the first auto-generated incident to an outage from outage records. Typically, Incident records includes an outage field which may be filled either manually or automatically to link to the outage records related to the incidents. The linkage detection module 218 fetches information associated with the first auto-generated incident and extracts the Outage record link corresponding to the first auto-generated incident from the Incident records. The incident characterization list updating module 220 automatically updates the incident characterization list based on the linkage of the first auto-generated incident to the outage. The system 106 further includes an auto-generated incident flagging module that automatically flags similar auto-generated incidents in the future for their propensity to cause the outage.

The incidents monitoring module 222 automatically monitors the first auto-generated incident until resolution to check if the suggested priority, the severity and the assignment group associated with the first auto-generated incident are manually overridden. The incident characterization list updating module 220 further automatically updates the incident characterization list based on the monitored information of the first auto-generated incident.

The auto-generated incident obtaining module 206 further automatically obtains a second auto-generated incident, from the machine data (MD) analysis system 116 or the application performance management (APM) system 114, generated for the configuration item (CI), based on any specified search criteria which is a Boolean expression on key metrics of the APM system 114 or the MD system 116 being met, or detection of a deviation in the value of the key metrics of the APM system 114 or the MD system 116 from a specified threshold value. The search criteria may include any Boolean predicate on available measures/metrics for example a CPU utilization >75% & Free Memory <10%, etc. Other examples of the search criteria may include an error raised in {list of critical errors}, an error raised in {list of critical errors for an application} & a CPU or Memory utilization for an application beyond a normal range where normal range is identified by APM system 114/MD systems 116, etc. In an embodiment, the deviation in the value of key measures or key metrics includes at least one of but not limited to an increase in application response time, an increase in key transaction response time, an increase in page rendering time, an increase in network time, an increase in web application time, an increase in queue time, an increase in Apdex score, an increase in database query time, an increase in error rates, critical errors or alerts from applications, hardware components, message queues or operating systems, a decrease in performance or an increase in CPU or memory utilization from a normal level.

The essence key phrases extraction module 208 further automatically extracts essence key phrases of the second auto-generated incident. The essence key phrases matching module 210 further automatically matches the essence key phrases of the second auto-generated incident with the essence key phrases of the incident characterization list to suggest priority, severity, historical resolution and resolution time, relevant knowledge base articles and assignment group for the second auto-generated incident. The auto-generated transformation module 211 further transforms the second auto-generated incident to a refined second auto-generated incident by populating its priority, severity, resolution, resolution time, relevant knowledge base articles and assignment group fields with the suggested values to obtain a computer-executable object saved in the memory 110 on the computer device 104 for execution by the processor 108 to aid in resolution of the second auto-generated incident.

In an embodiment, when (i) the first auto-generated incident is received from the application performance management (APM) system 114 and the second auto-generated incident is received from machine data (MD) analysis system 116, or (ii) the first auto-generated incident is received from the machine data (MD) analysis system 116 and the second auto-generated incident is received from the application performance management (APM) system 114, the incidents correlation module 224 automatically correlates the first auto-generated incident and the second auto-generated incident when (i) the configuration item (CI) associated with the first auto-generated incident and the second auto-generated incident are same, (ii) the time period at which the first auto-generated incident occurred and the time period at which the second auto-generated incident occurred are same and (iii) the essence key phrases of the first auto-generated incident and the essence key phrases of the second auto-generated incident match.

The manually generated incident obtaining module 226 automatically obtains a third incident that is manually generated by a user from an information technology service management (ITSM) system 112. The incidents correlation module 224 further automatically correlates the third incident with (i) an auto-generated incident that is received from one of the application performance management (APM) system 114 or the machine data (MD) analysis system 116 or (ii) auto-generated incidents that are received from both the application performance management (APM) system 114 and the machine data (MD) analysis system 116, by matching essence key phrases of the third incident with the essence key phrases of the auto-generated incidents. In an embodiment, the third incident and the auto-generated incidents are correlated when (a) the configuration item (CI) associated with the auto-generated incidents (e.g. the first auto-generated incident and/or the second auto-generated incident) and a configuration item (CI) associated with the third incident are same and (b) the time period of the auto-generated incidents (e.g. the first auto-generated incident and/or the second auto-generated incident) and the time period of the third incident are same. The incident characterization list updating module 220 further automatically updates the incident characterization list using the priority, severity and assignment group of the third incident. The coverage gap identification module 228 automatically identifies coverage gap associated with the configuration item (CI) from the application performance management (APM) system 114 and the machine data (MD) analysis system 116 when the third incident is received from the information technology service management (ITSM) system 112 and (i) an auto-generated incident is not received from one of the application performance management (APM) system 114 or the machine data (MD) analysis system 116, or (ii) no auto-generated incident is received from both the application performance management (APM) system 114 and the machine data (MD) analysis system 116.

In an embodiment, the system 106 comprises an information correlation module (further shown in FIG. 4) that automatically correlates information obtained from (a) the ITSM system 112, (b) the APM system 114 or (c) the MD analysis system 116.

Figure 3:
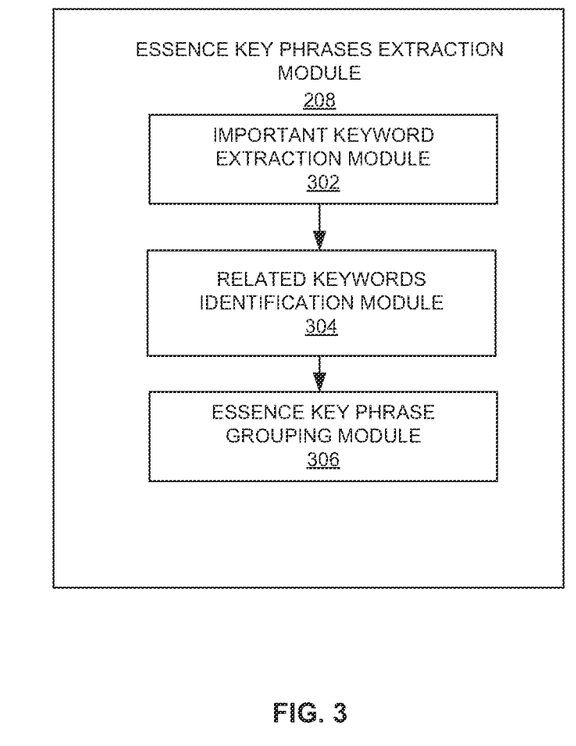
FIG. 3 illustrates an exploded view of an essence key phrases extraction module of FIG. 2 according to an embodiment herein.

FIG. 3 illustrates an exploded view of the essence key phrases extraction module 208 of FIG. 2 according to an embodiment herein. The essence key phrases extraction module 208 includes an important keyword extraction module 302, a related keywords identification module 304, and an essence key phrase grouping module 306. The important keyword extraction module 302 extracts important keywords using text analytics on textual fields of Incidents (e.g. the first auto-generated incidents, the second auto-generated incidents or the third incident). The related keywords identification module 304 identifies related keywords associated with the important keywords by analyzing a keyword synonym map that is built using semantic analysis. The essence key phrase grouping module 306 constructs the essence key phrases by combining relevant structured fields of Incidents with the important keywords including related keywords obtained by using text summarization techniques on descriptive fields of the Incidents. In an embodiment, the extraction of the essence key phrases is easier for the auto-generated incidents when compared to manually generated incidents as the auto-generated incidents include better structure and consistency in the descriptive text fields.

Figure 4:
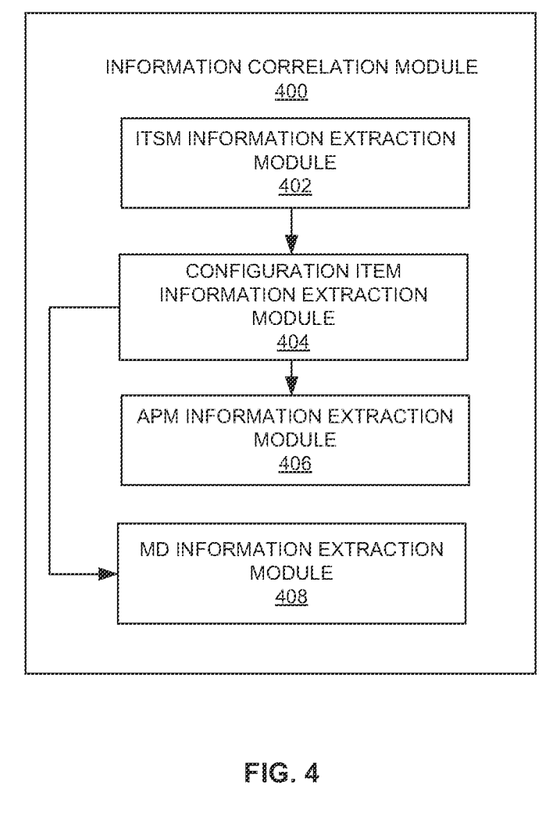
FIG. 4 illustrates an exploded view of an information correlation module of the system of FIG. 1 according to an embodiment herein.

FIG. 4 illustrates an exploded view of the information correlation module 400 of the system 106 of FIG. 1 according to an embodiment herein. The information correlation module 400 includes an ITSM information extraction module 402, a configuration item information extraction module 404, an APM information extraction module 406 and a MD information extraction module 408. The ITSM information extraction module 402 automatically extracts a first subset of information associated with a configuration item from the ITSM system 112. The configuration item information extraction module 404 automatically extracts application information for the same configuration item from a configuration item (CI) database. The APM information extraction module 406 automatically extracts a second subset of information for application matching the same configuration item from the APM system 114 based on the application information. The MD information extraction module 408 automatically extracts a third subset of information for application matching the same configuration item from the MD analysis system 116 based on the application information. The information correlation module 400 automatically combines the first subset of information, the second subset of information and the third subset of information to obtain the information associated with the configuration item.

Figure 5A:
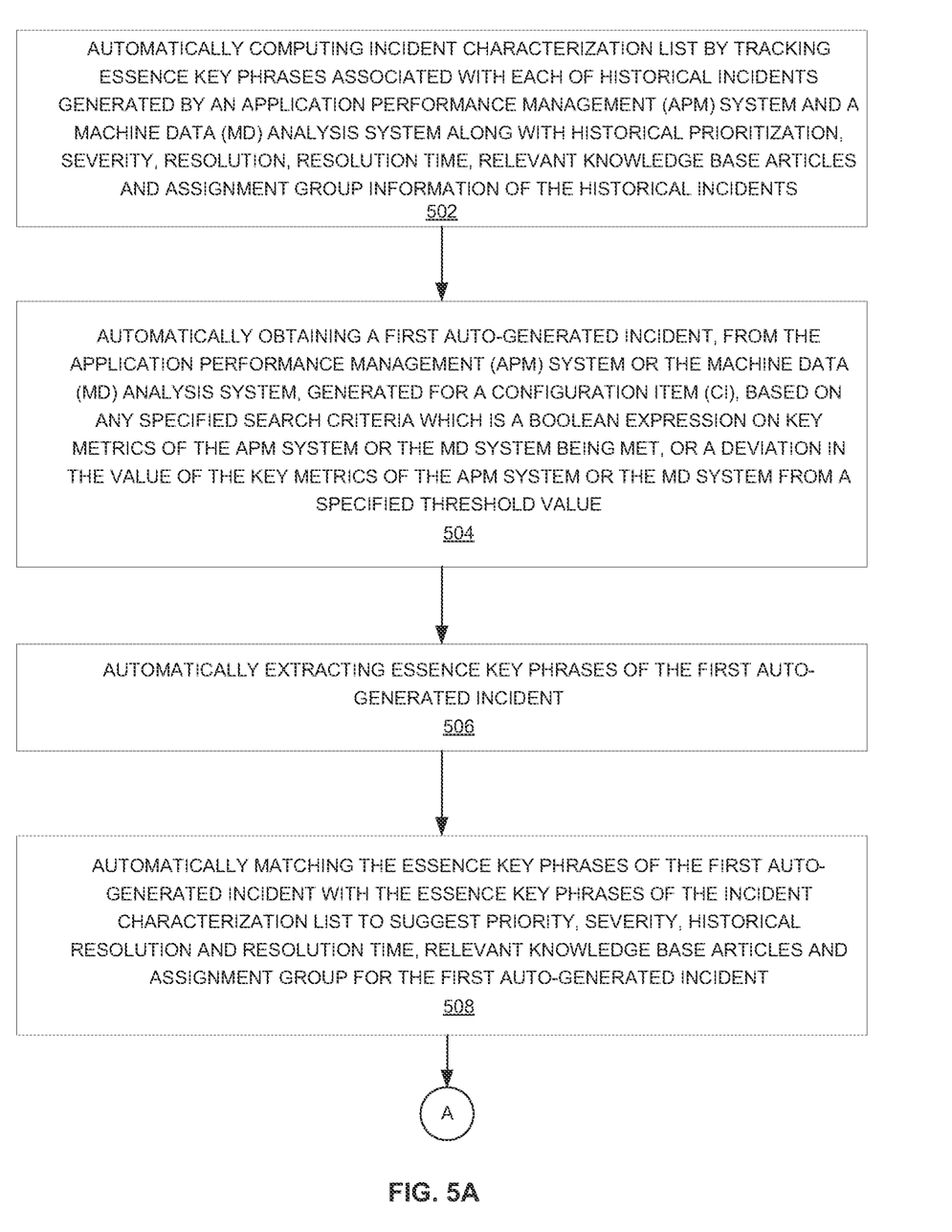
FIGS. 5A-5B are flow diagrams that illustrate a method for automatic suggestion and refinement of priority, severity, historical resolution, resolution time and assignment group to resolve auto-generated incidents using the auto-generated incidents resolvable system of FIG. 1 according to an embodiment herein.
Figure 5B:
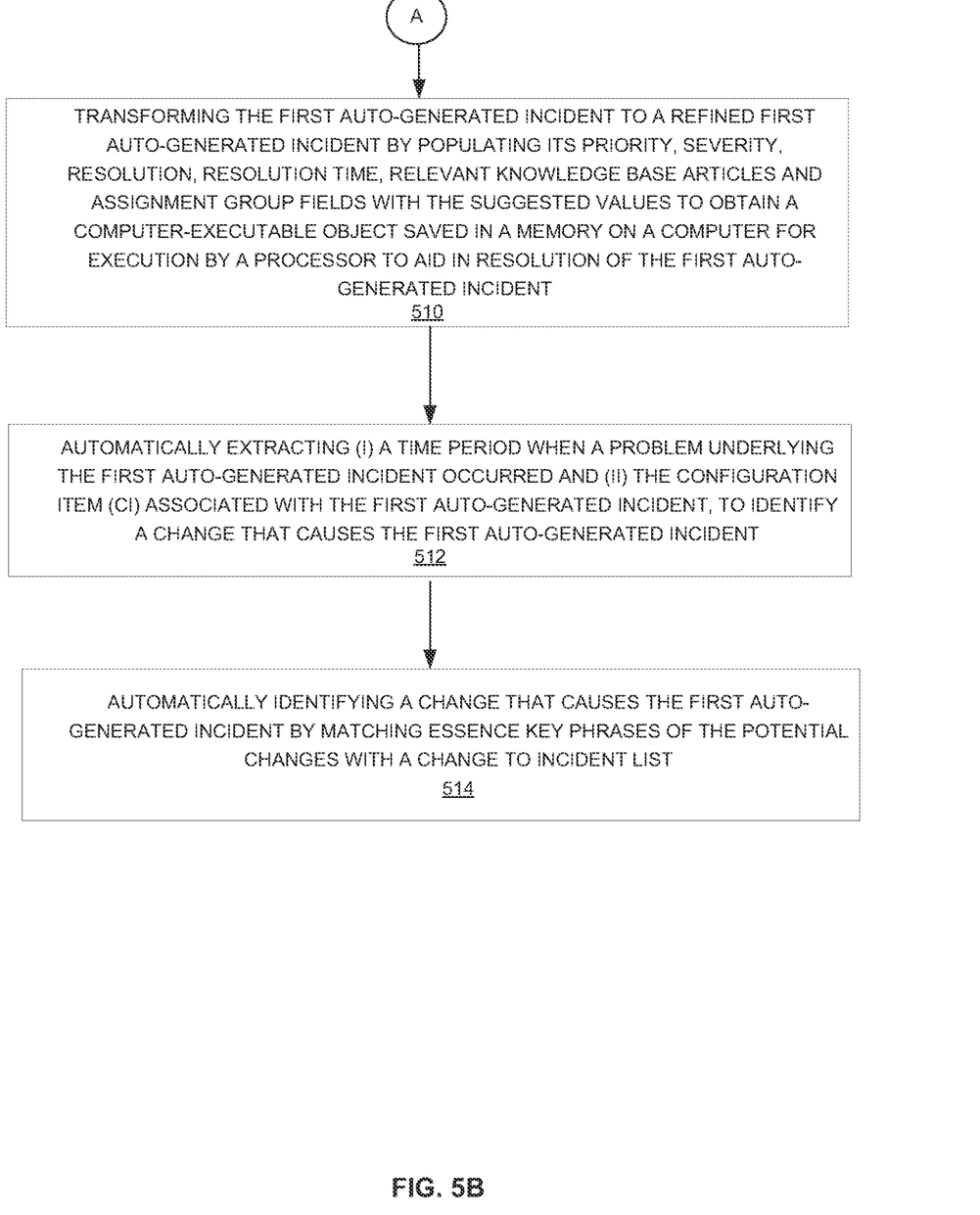

FIGS. 5A-5B are flow diagrams that illustrate a method for automatic suggestion and refinement of priority, severity, historical resolution, resolution time and assignment group to resolve auto-generated incidents using the system 106 of FIG. 1 according to an embodiment herein. At step 502, the incident characterization list computation module 204 automatically computes an incident characterization list by tracking essence key phrases associated with each of the historical incidents generated by an application performance management (APM) system 114 and a machine data (MD) analysis system 116 along with historical prioritization, severity, resolution, resolution time, relevant knowledge base articles and assignment group information of the historical incidents. At step 504, the auto-generated incident obtaining module 206 automatically obtains a first auto-generated incident from the application performance management (APM) system 114 or the machine data (MD) analysis system 116, generated for a configuration item (CI), based on any specified search criteria which is a Boolean expression on key metrics of the APM system 114 or the MD system 116 being met, or a deviation in the value of the key metrics of the APM system 114 or the MD system 116 from a specified threshold value. At step 506, the essence key phrases extraction module 208 automatically extracts essence key phrases of the first auto-generated incident. At step 508, the essence key phrases matching module 210 automatically matches the essence key phrases of the first auto-generated incident with the essence key phrases of the incident characterization list to suggest priority, severity, historical resolution and resolution time, relevant knowledge base articles and assignment group for the first auto-generated incident. At step 510, the auto-generated incident transformation module 211 transforms the first auto-generated incident to a refined first auto-generated incident by populating its priority, severity, resolution, resolution time, relevant knowledge base articles and assignment group fields with the suggested values to obtain a computer-executable object saved in the memory 110 on the computer device 104 for execution by the processor 108 to aid in resolution of the first auto-generated incident. At step 512, the time period extraction module 212 automatically extracts (i) a time period is automatically extracted when a problem underlying the first auto-generated incident occurred and (ii) the configuration item extraction module 214 automatically extracts the configuration item (CI) associated with the first auto-generated incident, to identify a change that causes the first auto-generated incident. In an embodiment, one or more changes that are executed for the configuration item (CI) in a time window prior to the time period of the first auto-generated incident are identified as potential changes that could have caused the first auto-generated incident. At step 514, the change identification module 216 automatically identifies a change that causes the first auto-generated incident by matching essence key phrases of the potential changes with a change to incident list. The change to incident list includes a list of historical changes with their essence key phrases. Each historical change attributes to an incident caused by the historical change. The change to incident list is built and maintained based on identified clusters of related Incident, Problem and Changes.

The embodiments herein may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
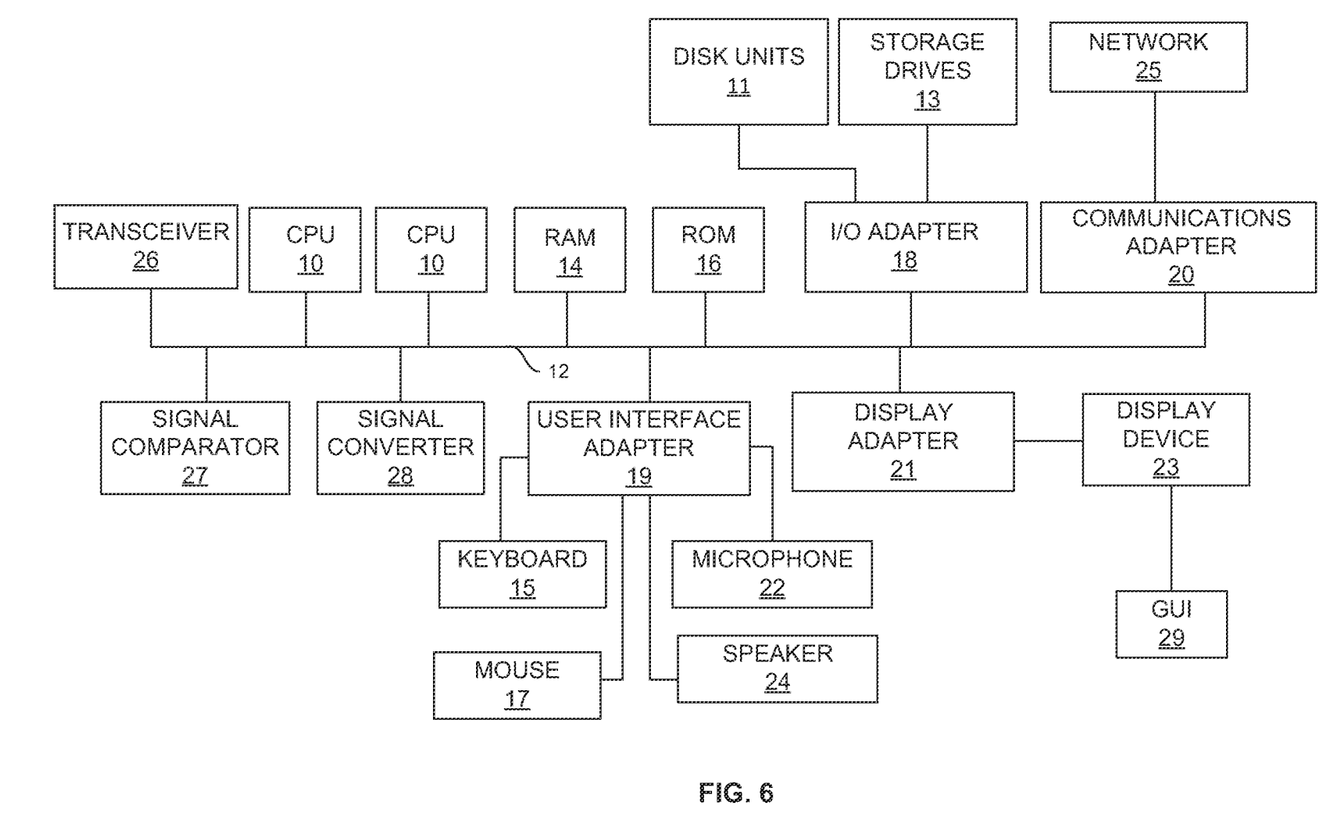
FIG. 6 is a computer device used in accordance with the embodiments herein.

A representative hardware environment for practicing the embodiments herein is depicted in FIG. 6, with reference to FIGS. 1 through 5. This schematic drawing illustrates a hardware configuration of an information handling/computer system/computing device 104 in accordance with the embodiments herein. The system 104 comprises at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 104 can read the inventive instructions on the program storage devices and follow these instructions to execute the methodology of the embodiments herein. The system 104 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The system 106 helps in resolving incidents in a timely manner by providing information to help with assignment of the incidents and root cause analysis. The system 106 identifies changes behind each auto-generated incident (e.g. the first auto-generated incident or the second auto-generated incident), and correlates such auto-generated incidents received from the application performance management (APM) system or the machine data (MD) analysis system amongst each other and with manually created Incidents received from the ITSM system. The system 106 not only resolves auto-generated incidents generated by the APM system 114 and the MD system 116 but also resolves incidents that are generated by the information technology service management (ITSM) system 112.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A non-transitory computer readable storage medium storing a sequence of instructions, which when executed by a processor, causes automatic suggestion and refinement of priority, severity, historical resolution, resolution time and assignment group to resolve incidents, the sequence of instructions comprising:

automatically computing an incident characterization list by tracking essence key phrases associated with each of historical incidents generated in an IT Service Management (ITSM) system along with historical prioritization, severity, resolution, resolution time, relevant knowledge base articles and assignment group information of said historical incidents;

automatically obtaining an incident, from said ITSM system, generated for a configuration item (CI);

automatically extracting (i) a time period when a problem underlying said incident occurred and (ii) said configuration item (CI) associated with said incident, to identify a change that causes said incident, wherein one or more changes that are executed for said configuration item (CI) in a time window prior to said time period of said incident are identified as potential changes that could have caused said incident;

automatically extracting essence key phrases of said incident;

automatically matching said essence key phrases of said incident with said essence key phrases of said incident characterization list to identify priority, severity, historical resolution and resolution time, relevant knowledge base articles and assignment group for said incident; and transforming said incident to a refined incident by populating its priority, severity, resolution, resolution time, relevant knowledge base articles and assignment group fields to obtain a computer-executable object saved in a memory on a computer for execution by said processor to aid in resolution of said incident.

2. The non-transitory computer readable storage medium storing the sequence of instructions of claim 1, which when executed by said processor, causes automatic identification of a change that causes said incident by matching essence key phrases of said potential changes with a change to incident list, wherein said change to incident list comprises a list of historical changes with their essence key phrases, wherein each historical change attributes to an incident caused by said historical change, wherein said change to incident list is built and maintained based on identified clusters of related Incident, Problem and Changes.

3. A non-transitory computer readable storage medium storing a sequence of instructions, which when executed by a processor, causes automatic suggestion and refinement of priority, severity, historical resolution, resolution time and assignment group to resolve incidents, the sequence of instructions comprising:

automatically computing an incident characterization list by tracking essence key phrases associated with each of historical incidents generated in an IT Service Management (ITSM) system along with historical prioritization, severity, resolution, resolution time, relevant knowledge base articles and assignment group information of said historical incidents;

automatically obtaining an incident, from said ITSM system, generated for a configuration item (CI);

automatically extracting essence key phrases of said incident;

automatically matching said essence key phrases of said incident with said essence key phrases of said incident characterization list to identify priority, severity, historical resolution and resolution time, relevant knowledge base articles and assignment group for said incident;

transforming said incident to a refined incident by populating its priority, severity, resolution, resolution time, relevant knowledge base articles and assignment group fields to obtain a computer-executable object saved in a memory on a computer for execution by said processor to aid in resolution of said incident;

automatically monitoring said incident until resolution when a suggested priority, said severity and said assignment group associated with said incident are manually overridden; and automatically updating said incident characterization list based on the monitored information of said incident.

4. The non-transitory computer readable storage medium storing the sequence of instructions of claim 3, which when executed by said processor, causes:

automatic detection of a linkage of said incident to an outage from outage records;

automatic updating of said incident characterization list based on said linkage of said incident to said outage; and automatic flagging of similar incidents in the future for their propensity to cause said outage.

5. The non-transitory computer readable storage medium storing the sequence of instructions of claim 3, wherein said assignment group comprises one or more assignees, wherein said incident is assigned to a least loaded assignee when workload information for said one or more assignees is available within said assignment group.

6. An electronic computing device for automatically suggesting and refining priority, severity, historical resolution, resolution time and assignment group to resolve incidents, said electronic computing device comprising:

a memory that comprises a database that stores (i) a set of instructions and (ii) historical incidents generated in an IT Service Management (ITSM) system along with historical prioritization, severity, resolution, resolution time, relevant knowledge base articles and assignment group information of said historical incidents; and a processor that executes said set of instructions, wherein said processor is to:

automatically compute an incident characterization list by tracking essence key phrases associated with each of said historical incidents generated in an IT Service Management (ITSM) system along with historical prioritization, severity, resolution, resolution time, relevant knowledge base articles and assignment group information of said historical incidents;

automatically obtain an incident, generated for a configuration item (CI);

automatically extract (i) a time period when a problem underlying said incident occurred and (ii) said configuration item (CI) associated with said incident to identify a change that causes said incident, wherein one or more changes that are executed for said configuration item (CI) in a time window prior to said time period of said incident are identified as potential changes that could have caused said incident;

automatically extract essence key phrases of said incident;

automatically match said essence key phrases of said incident with said essence key phrases of said incident characterization list to identify priority, severity, historical resolution and resolution time, relevant knowledge base articles and assignment group for said incident;

transform said incident to a refined incident by populating its priority, severity, resolution, resolution time, relevant knowledge base articles and assignment group fields to obtain a computer-executable object saved in said memory on said electronic computing device for execution by said processor to aid in resolution of said incident;

monitor said incident until resolution when a suggested priority, said severity and said assignment group associated with said incident are manually overridden; and automatically update said incident characterization list based on the monitored information of said incident.

7. The electronic computing device of claim 6, wherein said processor is to automatically identify a change that causes said incident by matching essence key phrases of said potential changes with a change to incident list, wherein said change to incident list comprises a list of historical changes with their essence key phrases, wherein each historical change attributes to an incident caused by said historical change, wherein said change to incident list is built and maintained based on identified clusters of related Incident, Problem and Changes.

8. The electronic computing device of claim 6, wherein said processor is to:

automatically detect a linkage of said incident to an outage from outage records;

automatically update said incident characterization list based on said linkage of said incident to said outage; and automatically flag similar incidents in the future for their propensity to cause said outage.

9. The electronic computing device of claim 6, wherein said assignment group comprises one or more assignees, wherein said incident is assigned to a least loaded assignee when workload information for said one or more assignees is available within said assignment group.

* * * * *